United States Patent
Matsushita

(10) Patent No.: US 10,471,789 B2
(45) Date of Patent: Nov. 12, 2019

(54) SUSPENSION DEVICE

(71) Applicant: HONDA MOTOR CO., LTD., Minato-Ku, Tokyo (JP)

(72) Inventor: Kosuke Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 15/559,224

(22) PCT Filed: Mar. 19, 2015

(86) PCT No.: PCT/JP2015/058177
§ 371 (c)(1),
(2) Date: Sep. 18, 2017

(87) PCT Pub. No.: WO2016/147371
PCT Pub. Date: Sep. 22, 2016

(65) Prior Publication Data
US 2018/0093541 A1    Apr. 5, 2018

(51) Int. Cl.
*B60G 7/00*    (2006.01)
*B60G 3/20*    (2006.01)
*B60G 7/02*    (2006.01)

(52) U.S. Cl.
CPC .............. *B60G 7/001* (2013.01); *B60G 3/20* (2013.01); *B60G 7/008* (2013.01); *B60G 7/02* (2013.01);
(Continued)

(58) Field of Classification Search
CPC .......... B60G 7/001; B60G 7/008; B60G 3/20; B60G 7/02; B60G 2204/41; B60G 2204/148; B60G 2204/143
See application file for complete search history.

(56) References Cited

U.S. PATENT DOCUMENTS 2,304,291 A * 12/1942 Wahlberg ............... B60G 15/06
                                                     280/124.127
2,549,942 A *  4/1951 Smith .................... B60G 15/06
                                                     267/222
(Continued)

FOREIGN PATENT DOCUMENTS

DE    10 2010 029 032 A1    11/2011
EP     0 691 225 B1         12/1999
(Continued)

OTHER PUBLICATIONS

Office Action dated May 8, 2018 issued in the corresponding Japanese Patent Application 2017-505967 with the English translation therof.
(Continued)

*Primary Examiner* — Drew J Brown
(74) *Attorney, Agent, or Firm* — Carrier Blackman & Associates, P.C.; Joseph P. Carrier; Jeffrey T. Gedeon

(57) ABSTRACT

Provided is a semi-trailing suspension device including: a trailing arm that is coupled to a vehicle body in a turnable manner; a trailing bush that is provided between the vehicle body and the trailing arm and pivotally supports the trailing arm in a turnable manner; a lower arm that is coupled to the vehicle body in a turnable manner; a lower arm bush that is provided between the vehicle body and the lower arm and pivotally supports the lower arm in a turnable manner; and a hinge mechanism that couples the trailing arm and the lower arm to each other in a relatively displaceable manner.

2 Claims, 10 Drawing Sheets

(52) U.S. Cl.
CPC .. *B60G 2204/143* (2013.01); *B60G 2204/148* (2013.01); *B60G 2204/41* (2013.01)

(56) References Cited

U.S. PATENT DOCUMENTS

| | | | |
|---|---|---|---|
| 3,892,284 A | 7/1975 | Braess et al. | |
| 4,530,514 A * | 7/1985 | Ito | B60G 3/26 |
| | | | 267/276 |
| 4,715,614 A * | 12/1987 | Kijima | B60G 3/225 |
| | | | 267/248 |
| 4,758,018 A * | 7/1988 | Takizawa | B60G 3/202 |
| | | | 280/124.109 |
| 4,840,396 A * | 6/1989 | Kubo | B60G 3/202 |
| | | | 280/124.143 |
| 5,829,764 A * | 11/1998 | Griffiths | B60G 3/26 |
| | | | 280/5.52 |
| 6,079,722 A * | 6/2000 | Kato | B60G 3/265 |
| | | | 280/124.1 |
| 6,099,005 A * | 8/2000 | Wakatsuki | B60G 3/20 |
| | | | 280/124.135 |
| 2004/0000767 A1* | 1/2004 | Oda | B60G 3/20 |
| | | | 280/86.751 |
| 2004/0135338 A1* | 7/2004 | Asteggiano | B60G 3/14 |
| | | | 280/124.134 |
| 2010/0001486 A1* | 1/2010 | Natsukari | B60G 3/20 |
| | | | 280/124.143 |
| 2010/0102527 A1 | 4/2010 | Yanagida | |
| 2010/0201086 A1* | 8/2010 | Sagara | B60G 3/20 |
| | | | 280/5.522 |
| 2012/0068431 A1* | 3/2012 | Jakob | B60G 3/145 |
| | | | 280/124.128 |
| 2012/0217714 A1 | 8/2012 | Kiselis et al. | |
| 2013/0175747 A1* | 7/2013 | Uemori | B60G 11/16 |
| | | | 267/170 |
| 2017/0305222 A1* | 10/2017 | Preijert | B60G 11/08 |
| 2018/0093541 A1* | 4/2018 | Matsushita | B60G 3/20 |
| 2018/0215221 A1* | 8/2018 | Matsushita | B60G 21/0551 |

FOREIGN PATENT DOCUMENTS

| | | |
|---|---|---|
| JP | S52-37649 B2 | 9/1977 |
| JP | S58-192109 U | 12/1983 |
| JP | S60-33111 A | 2/1985 |
| JP | 2006-321376 A | 11/2006 |
| JP | 2008-018924 A | 1/2008 |
| JP | 2008-195296 A | 8/2008 |
| JP | 2013-509325 A | 3/2013 |

OTHER PUBLICATIONS

Office Action dated Jan. 8, 2019 issued in the counterpart Japanese Patent Application 2017-505967 and the English translation thereof.

* cited by examiner

SUSPENSION DEVICE

TECHNICAL FIELD

The present invention relates to semi-trailing suspension devices.

BACKGROUND ART

For example, Patent Literature 1 discloses a semi-trailing suspension device 3 that is divided in advance into a trailing arm 1 and a lower arm (one piece arm) 2 as shown in FIG. 9A. In the suspension device 3, a vehicle rear side end 1a of the trailing arm 1 and a vehicle width direction outer end 2a of the lower arm 2 are hinge-coupled by two rubber bushes 4a, 4b.

A vehicle front side end 1b of the trailing arm 1 is attached to a vehicle body via a trailing bush 5 in a turnable manner. A vehicle width direction inner end 2b of the lower arm 2 is attached to the vehicle body via a trailing bush 6 in a turnable manner. In this case, a semi-trailing axis A1 (see dotted and dashed thin line) with respect to the vehicle body is formed by connecting a turning center point C1 of the trailing arm 1 to a turning center point C2 of the lower arm 2 with each other.

CITATION LIST

Patent Literature

Patent Literature 1: EP0691225B1

SUMMARY OF INVENTION

Technical Problem

In general, in a semi-trailing suspension device including a suspension device 3 disclosed in Patent Literature 1, camber characteristics at the time of a suspension stroke (i.e., a relationship between a suspension stroke quantity in the vertical direction and a camber angle) is determined by the semi-trailing axis A1.

FIG. 9B is a characteristic diagram showing a relationship between a suspension stroke quantity and a camber angle (i.e., camber characteristics) in the suspension device 3. From FIG. 9B, a camber characteristics line E1 needed for the semi-trailing axis A1 can be obtained. In addition, the camber angle means an inclination angle of a tire in a front view of the vehicle. If an upper portion of the tire inclines outwardly, it is called a positive camber. If the upper portion of the tire inclines inwardly, it is called a negative camber.

In fact, however, a spare tire pan for housing a spare tire, a layout space 7 for a differential mechanism in a 4-Wheel-Drive (4WD) vehicle, etc. are necessary (see FIG. 10A). In order to avoid any interference (contact) between the layout space 7 and the suspension device 3, an inclined angle (an arrangement angle) of the lower arm 2 relative to the vehicle body may be changed.

The semi-trailing axis A1 is moved in accordance with the change of the inclined angle of the lower arm 2 (see dotted and dashed bold line). Due to the movement of the semi-trailing axis A1, an actual camber characteristics line E2 (see dashed line) set by the layout space 7 is decreased to be lower than the preliminarily required camber characteristics line E1 (i.e., camber angle) (see FIG. 10B). As a result, compared to the required camber characteristics line E1, it is difficult for the actual camber characteristics line E2 set by the layout space 7 to obtain a large camber angle corresponding to an increase in the suspension stroke quantity.

An object of the present invention is to provide a suspension device which can avoid decrease in the camber characteristics while keeping a desired layout space.

Solution to Problem

For achieving the above object, according to one aspect of the present invention, a semi-trailing suspension device includes: a trailing arm that is coupled to a vehicle body in a turnable manner; a trailing bush that is provided between the vehicle body and the trailing arm and pivotally supports the trailing arm in a turnable manner; a lower arm that is coupled to the vehicle body in a turnable manner; a lower arm bush that is provided between the vehicle body and the lower arm and pivotally supports the lower arm in a turnable manner; and a hinge mechanism that couples the trailing arm and the lower arm to each other in a manner allowing relative displacement, in which the hinge mechanism is provided with an upper bush disposed on an upper side and a lower bush disposed on a lower side, and a stiffness of the upper bush is lower than that of the lower bush.

According to the present invention, the stiffness of the upper bush is lower than that of the lower bush. For example, when a lateral force is applied as an input load, the lower bush having higher stiffness than that of the upper bush can support a component force caused by the lateral force and keep suspension stiffness at high. Further, according to the present invention, when a suspension stroke in vertical direction is applied as the input load, the upper bush having lower stiffness than that of the lower bush moves toward a vehicle width direction inner side, the camber angle of the tire can be made large, and large camber characteristics can be obtained.

In addition, according to the present invention, the upper bush and the lower bush have rubber elastic bodies respectively. The rubber elastic body of the upper bush is made of a soft rubber, and the rubber elastic body of the lower bush is made of a hard rubber.

According to the present invention, the upper bush and the lower bush having different stiffnesses can be made easily by using soft and hard rubbers having different hardnesses (elastic forces).

Advantageous Effects of Invention

In the present invention, a suspension device which can avoid decrease in camber characteristics while keeping a desired layout space can be obtained.

DESCRIPTION OF EMBODIMENTS

Figure 1:
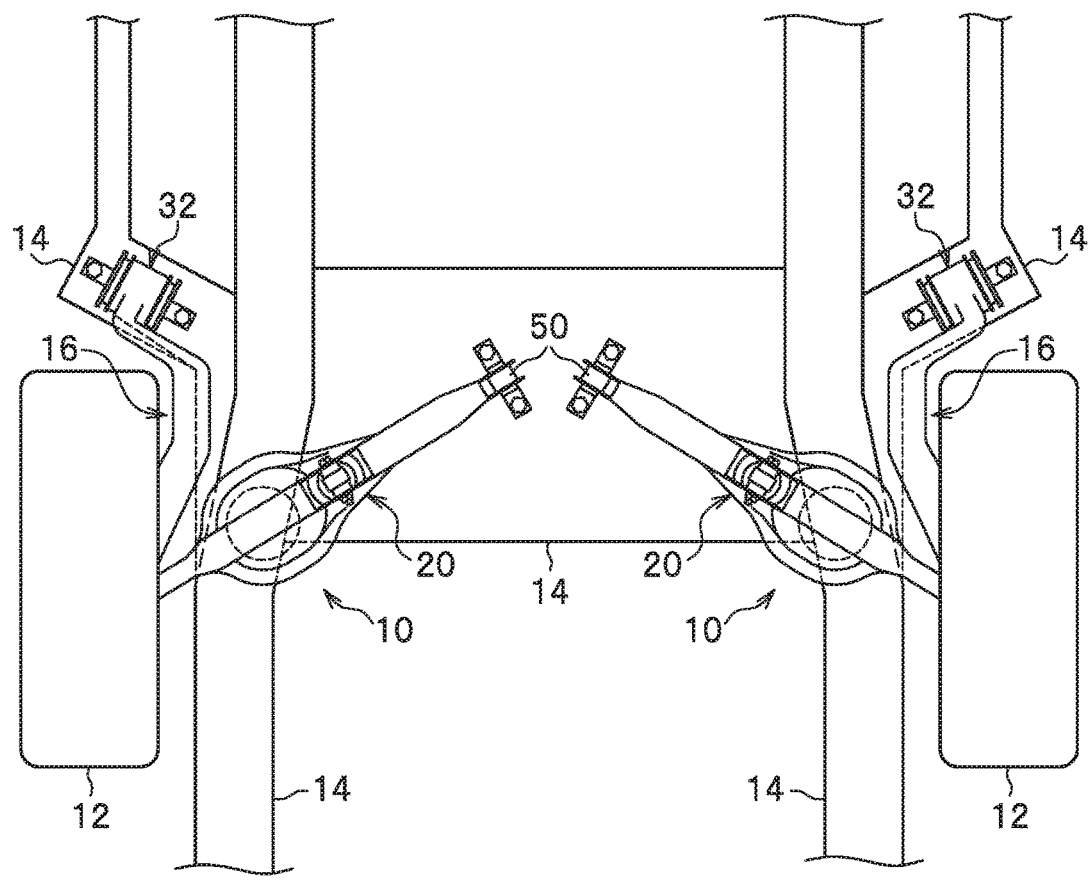
FIG. 1 is a bottom plan view of a state where a suspension device according to an embodiment of the present invention is applied respectively to a left rear wheel and a right rear wheel, as viewed from right below a vehicle.
Figure 1:
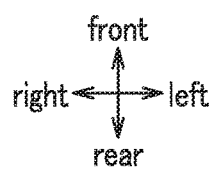
Figure 2:
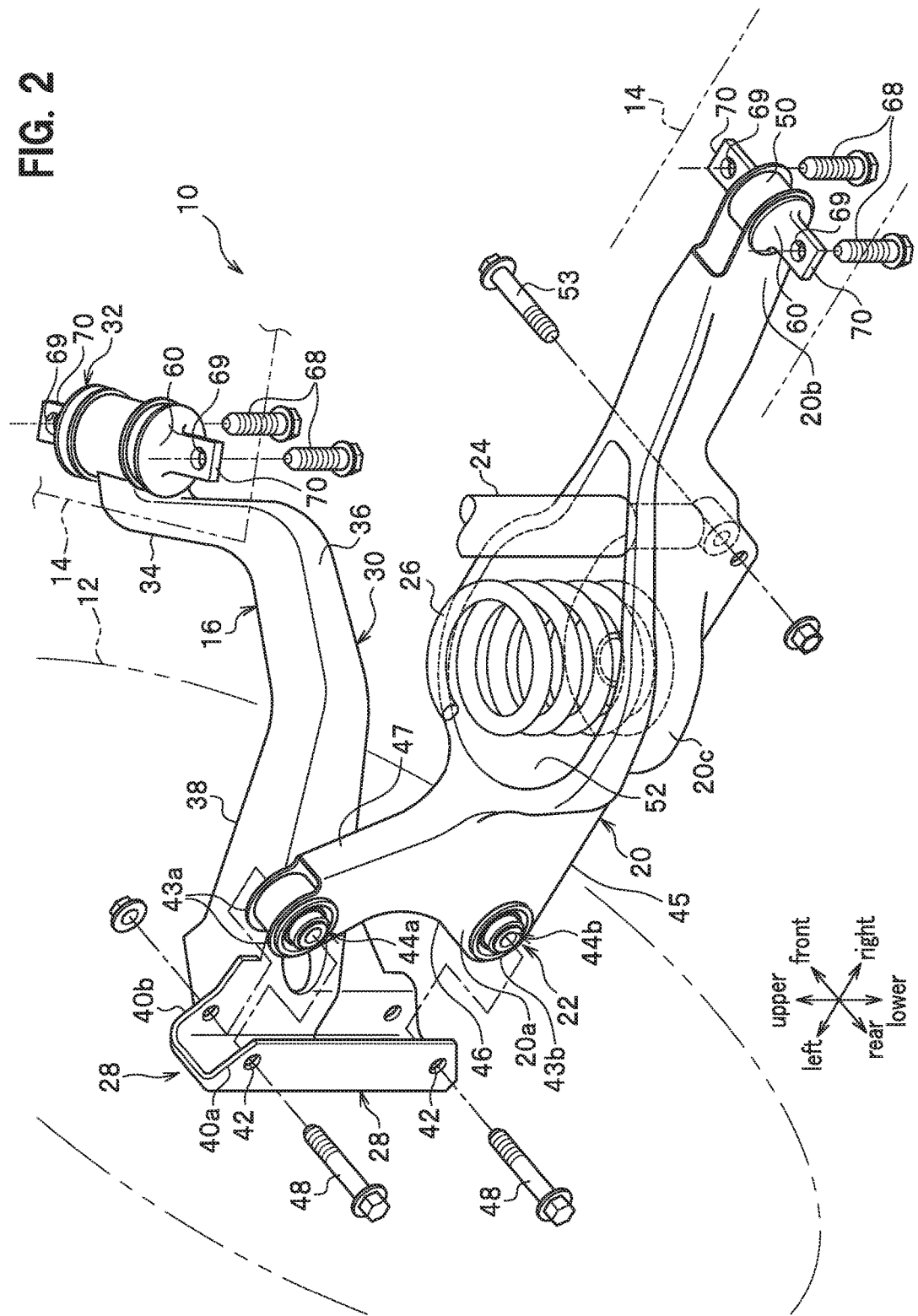
FIG. 2 is an exploded perspective view of the suspension device shown in FIG. 1.
Figure 3:
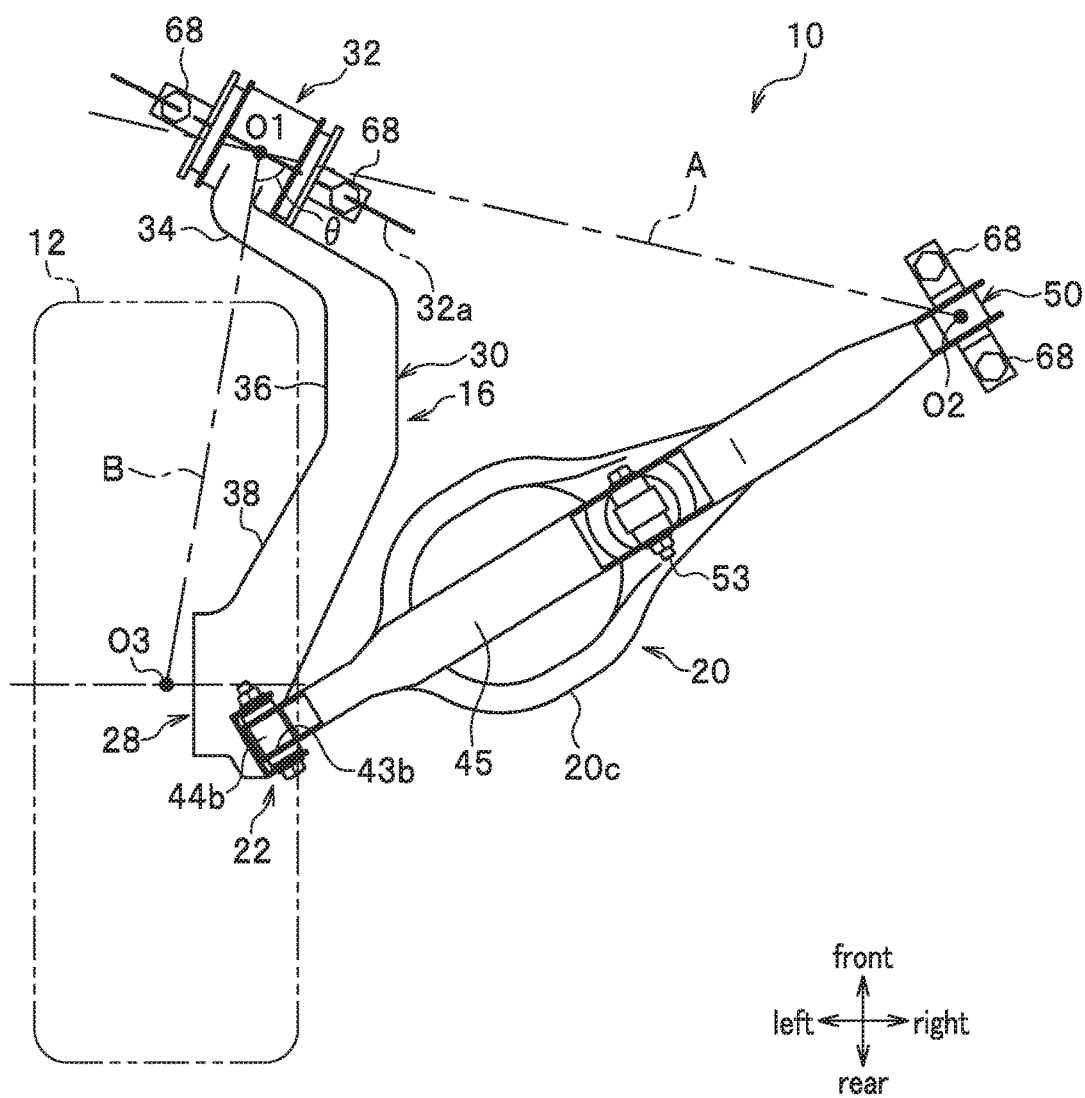
FIG. 3 is a bottom view of the suspension device shown in FIG. 1 as viewed from right below.
Figure 4:
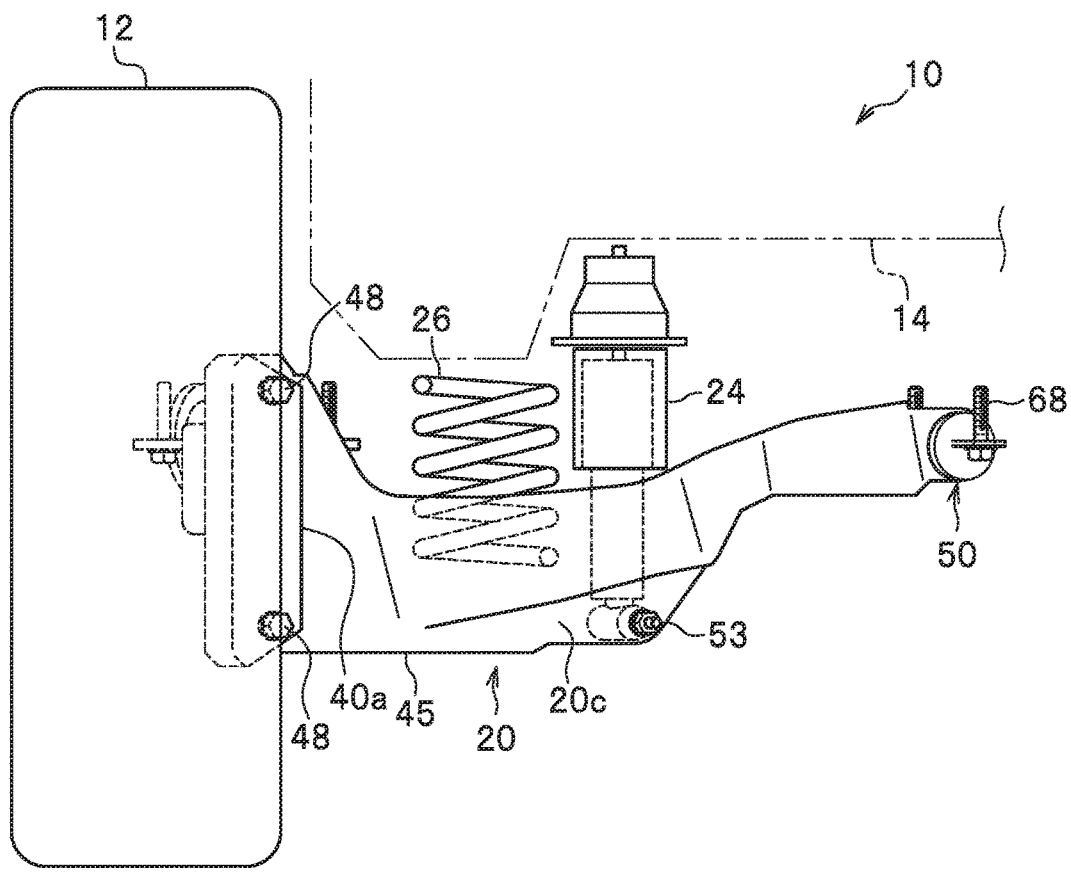
FIG. 4 is a side view of the suspension device shown in FIG. 1 as viewed in a diagonal direction from the vehicle rear side.
Figure 4:
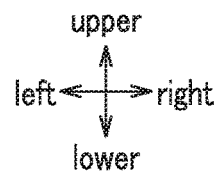

Hereinafter, embodiments of the present invention are described in detail with reference to the accompanying drawings as appropriate. FIG. 1 is a bottom plan view of a state where a suspension device according to an embodiment of the present invention is applied respectively to a left rear wheel and a right rear wheel, as viewed from right below a vehicle. FIG. 2 is an exploded perspective view of the suspension device shown in FIG. 1. FIG. 3 is a bottom plan view of the suspension device shown in FIG. 1 as viewed from right below thereof. FIG. 4 is a side view of the suspension device shown in FIG. 1 as viewed in a diagonal direction from the vehicle rear side. In the figures, "front and rear" indicates the vehicle front-rear direction, "left and right" indicates the vehicle width direction (left-right direction), and "upper and lower" indicates the vehicle upper-lower direction (vertical direction) respectively.

As shown in FIG. 1, a suspension device 10 is disposed independently to a left rear wheel 12 and a right rear wheel 12 (hereinafter also referred to as a wheel 12), and is configured as an independent suspension type rear suspension that supports left and right rear wheels 12, 12 in a rotatable manner. The right rear wheel 12 and left rear wheel 12 are disposed such that rear suspensions 10, 10 of the same configuration are located symmetrically with each other.

As shown in FIG. 2, the suspension device 10 includes a semi-trailing suspension including: a trailing arm 16 that pivotally supports the wheel (left rear wheel) 12 via an axle (not shown) in a rotatable manner and is coupled to a vehicle body 14 in a turnable manner; a lower arm 20 that supports a vehicle rear side of the trailing arm 16; and a hinge mechanism 22 that couples the trailing arm 16 and lower arm 20 to each other in a relatively displaceable manner. Further, the suspension device 10 includes a damper 24 and a spring 26, which are disposed on the lower arm 20 separately.

The trailing arm 16 is located at a rear end in the vehicle front-rear direction and includes an arm body section 28 provided with the hinge mechanism 22, and an arm section 30 extending from the arm body section 28 in the vehicle front-rear direction. A trailing bush 32 that pivotally supports the trailing arm 16 in a turnable manner is mounted at the vehicle front side end of the arm section 30.

As shown in FIGS. 2 and 3, the arm section 30 includes: an L-shaped bent section 34 that is mounted on the trailing bush 32 and bends substantially in a L-shape in the bottom view; a linear section 36 that is continuous to the L-shaped bent section 34 and extends substantially linearly along the vehicle front-rear direction; and an intersection section 38 that extends from the linear section 36 to the arm body section 28, and extends from the vehicle width direction inner side toward the vehicle width direction outer side and intersects with the vehicle front-rear direction in the bottom view.

The hinge mechanism 22 includes the pair of opposite pieces 40a, 40b provided on the arm body section 28 of the trailing arm 16, the vehicle width outer end 20a of the lower arm 20, the pair of upper and lower bushes 44a, 44b mounted on the vehicle width outer ends 20a, 20a of the lower arm 20, and the pair of bolts 48, 48 that couple the vehicle rear end of the trailing arm 16 and the vehicle width outer end 20a of the lower arm 20 to each other via the pair of upper and lower bushes 44a, 44b.

As shown in FIG. 2, the arm body section 28 includes a pair of opposite pieces 40a, 40b that extend in the vehicle body vertical direction and face substantially in parallel with each other. The pair of opposite pieces 40a, 40b protrude substantially inward in the vehicle width direction respectively, and a bolt insertion hole 42 is formed at the top and bottom thereof.

The lower arm 20 has a vehicle width outer end 20a provided at one end, an vehicle width inner end 20b provided at another end, and a lower arm body 20c provided between the vehicle width outer end 20a and the vehicle width inner end 20b. The vehicle width outer end 20a is provided with an upper support section 43a and a lower support section 43b which branch from a depression 46 in the vertical direction.

The upper support section 43a and the lower support section 43b are provided with through holes respectively. The upper bush 44a and the lower bush 44b are inserted into the through holes respectively at a predetermined interval in the vertical direction. The upper bush 44a and the lower bush 44b are, for example, rubber bushes, and have different stiffnesses. The stiffness of the upper bush 44a is lower than that of the lower bush 44b.

That is, the upper bush 44a is made to be softer than the lower bush 44b, and the lower bush 44b is made to be harder than the upper bush 44a. In other words, when a predetermined load is applied to the upper bush 44a and the lower bush 44b, a deformation quantity of the upper bush 44a is larger than that of the lower bush 44b.

The depression 46 is formed between the upper bush 44a and the lower bush 44b, and is curved as viewed from rear of the vehicle. This depression 46 serves as a punched section, and the lower arm 20 is made to be light in weight.

The lower support section 43b is continuous to a lower arm bottom section 45 which extends along an axis of the lower arm 20 (see FIGS. 2 and 3), and is formed at a tip of the lower arm bottom section 45. As shown in FIG. 2, the upper support section 43a is provided at a tip of a projecting section 47 which projects upward obliquely from the lower arm body 20c toward a trailing arm 16. In this way, a stiffness of the lower support section 43b is higher than that of the upper support section 43a. As a result, the upper support section 43a and the lower support section 43b, which support the upper bush 44a and the lower bush 44b respectively, have different stiffnesses respectively corresponding to those of the upper bush 44a and the lower bush 44b.

The trailing arm 16 is coupled to the lower arm 20 in a manner allowing relative displacement via the upper bush 44a, the lower bush 44b, and the pair of bolts 48, 48 inserted into the bolt insertion holes 42, 42 of the pair of opposite pieces 40a, 40b.

The vehicle width inner end 20b of the lower arm 20 is provided with a lower arm bush 50 that supports the lower arm 20 with respect to the vehicle body 14 (for example, a cross member, see FIG. 1) in a turnable manner.

A recess 52 of a composite shape formed by combination of a substantially circular shape and a triangular shape as viewed from top is disposed between the vehicle width outer end 20a and the vehicle width inner end 20b of the lower arm 20 (see FIG. 2). The recess 52 is provided with the damper 24 that attenuates vibration transmitted from the wheel 12, and a spring (coil spring) that exhibits a spring force, separately from each other. The damper 24 is attached to the lower arm 20 in a turnable manner with a rod 53 coupled to the lower arm 20 as the turning center.

As shown in FIG. 4, in the recess 52 (see FIG. 2), the spring 26 is disposed on the vehicle width outer side, and the damper 24 is disposed on the vehicle width inner side. In other words, the damper 24 is disposed deeper into inner side of the vehicle width direction of the lower arm 20 than the spring 26. Effects of such arrangements are described later in detail (see FIG. 8B).

Thus, the trailing arm 16 and the lower arm 20 are mounted on the vehicle body 14 respectively via the trailing bush 32 and the lower arm bush 50 in a turnable manner. A semi-trailing axis A is formed by connecting a turning center point O1 of the trailing arm 16 to a turning center point O2 of the lower arm bush 50 with each other by an imaginary line. The semi-trailing axis A is a turning axis of the suspension device 10 with respect to the vehicle body 14.

Next, examples of the upper bush 44a and the lower bush 44b will be explained.

Figure 5A:
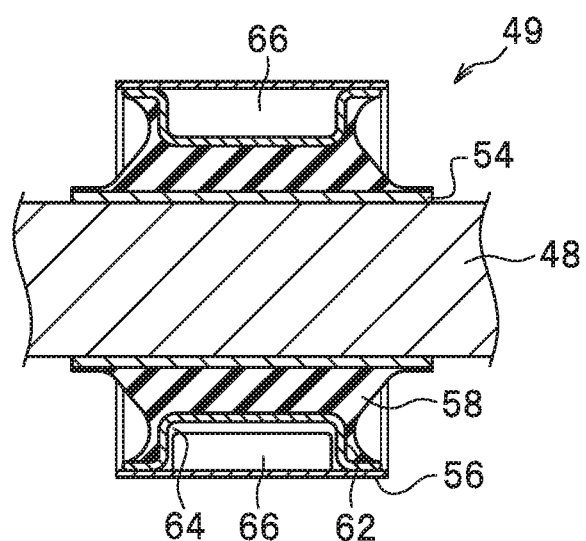
FIG. 5A is a sectional view of a bush according to a first example taken along the line of an axis.
Figure 5B:
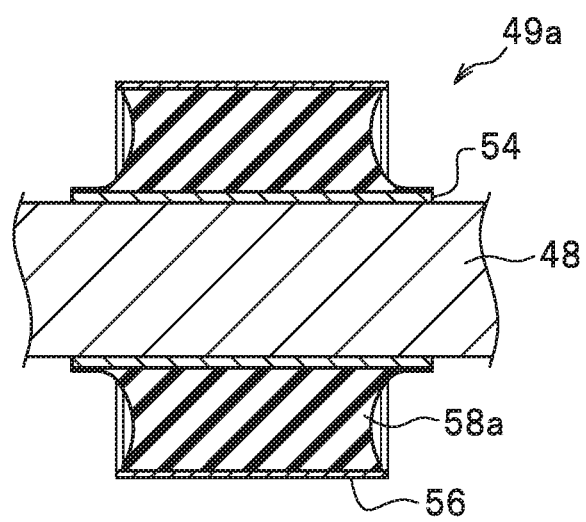
FIG. 5B is a sectional view of a bush according to a second example taken along the line of an axis.

FIG. 5A is a sectional view of a bush according to a first example taken along the line of an axis; and FIG. 5B is a sectional view of a bush according to a second example taken along the line of an axis.

As shown in FIG. 5A, a bush 49 according to a first example includes an inner cylindrical member 54, an outer cylindrical member 56 that is disposed on the outer diameter side of the inner cylindrical member 54, a rubber elastic body 58 provided between the inner cylindrical member 54 and the outer cylindrical member 56, and a bolt 48 that passes through the inner cylindrical member 54.

An intermediate sleeve 62 is provided between the inner cylindrical member 54 and the outer cylindrical member 56. The intermediate sleeve 62 includes an arc-shaped recess 64 extending in the circumferential direction. A sealed space section 66 is disposed between the arc-shaped recess 64 and an inner wall of the outer cylindrical member 56. The space section 66 functions as a liquid sealing compliance bush when a liquid (not shown) is sealed.

As indicated by a bush 49a according to a second example of FIG. 5B, the bush is not limited to the liquid sealing type bush. For example, a bush formed only by a rubber elastic body 58a adhered by vulcanization adhesion between the inner cylindrical member 54 and the outer cylindrical member 56 may be used without provision of the intermediate sleeve 62 and the space section 66.

As shown in FIG. 2, the trailing bush 32 and the lower arm bush 30 are provided with shaft members 60. Flat-plate-shape plate pieces 70, 70 having a pair of mounting holes 69, 69 into which bolts 68, 68 may be inserted are provided on both sides of the shaft member 60 in the axial direction. The trailing bush 32 is attached to the vehicle body 14 by inserting mounting holes 69, 69 into bolts 68, 68. Also, the trailing bush 32 may be attached to a bracket (not shown) formed on the vehicle body 14 in a turnable manner by inserting bolts 68, 68 directly into the inside of the inner cylindrical member 54, without using the flat-plate-shape plate pieces 70, 70.

An axis of the shaft member 60 is aligned with the turning axis 32a of the trailing bush 32. As shown in FIG. 3, the turning axis 32a of the trailing bush 32 is disposed to be inclined toward the vehicle body inner rear side as viewed from bottom, with respect to the semi-trailing axis (imaginary line) A that connects the turning center point O1 of the trailing arm 16 relative to the vehicle body 14 to the turning center point O2 of the lower arm 20 with each other.

In this embodiment, the suspension device 10 is shown as viewed from right bottom of the vehicle body 14. However, when the vehicle body 14 is viewed from top, the suspension device 10 is depicted in a position symmetrical to the position of FIG. 3. Therefore, a point where the turning axis 32a of the trailing bush 32 is disposed to be inclined toward the vehicle body inner rear side as viewed from top with respect to the semi-trailing axis (imaginary line) A is the same as the case where the vehicle body 14 is viewed from right bottom.

In other words, the turning axis 32a of the trailing bush 32 is on an axis different from the semi-trailing axis A as viewed from bottom, and is set to a location turned by a predetermined angle in the clockwise direction with the turning center point O1 of the trailing bush 32 as a base point.

An intersection angle θ between an imaginary line B that connects the axle center point O3 of the wheel 12 to the turning center point O1 of the trailing arm 16 with each other and the turning axis 32a of the trailing bush 32 is set to be smaller than or equal to 90 degrees (θ≤90 degrees).

Figure 6A:
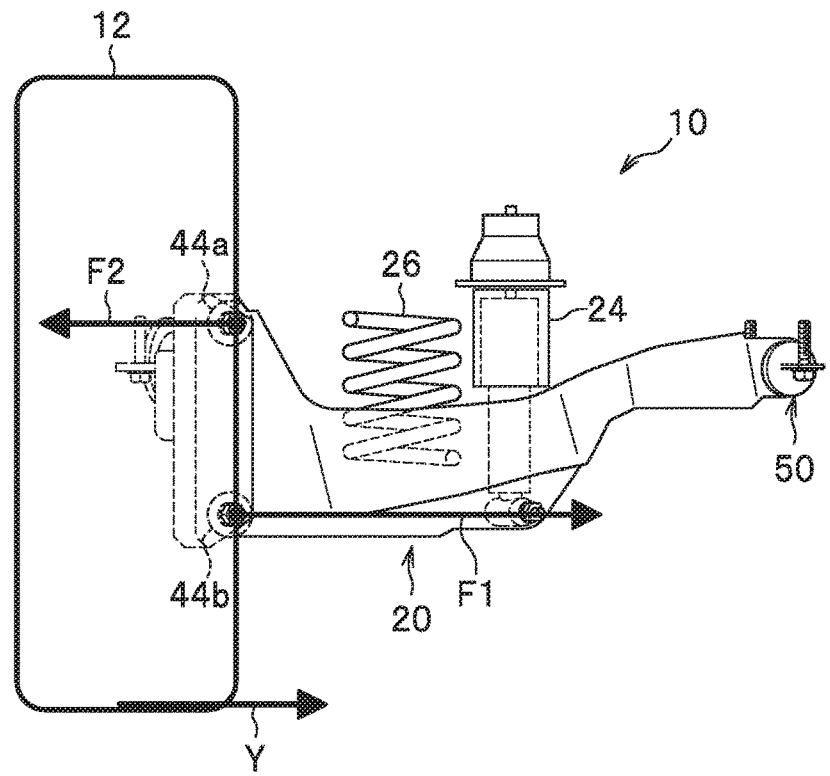
FIG. 6A is a schematic diagram showing a supported situation of the suspension device shown in FIG. 1 when a lateral force is applied to the suspension device.
Figure 6B:
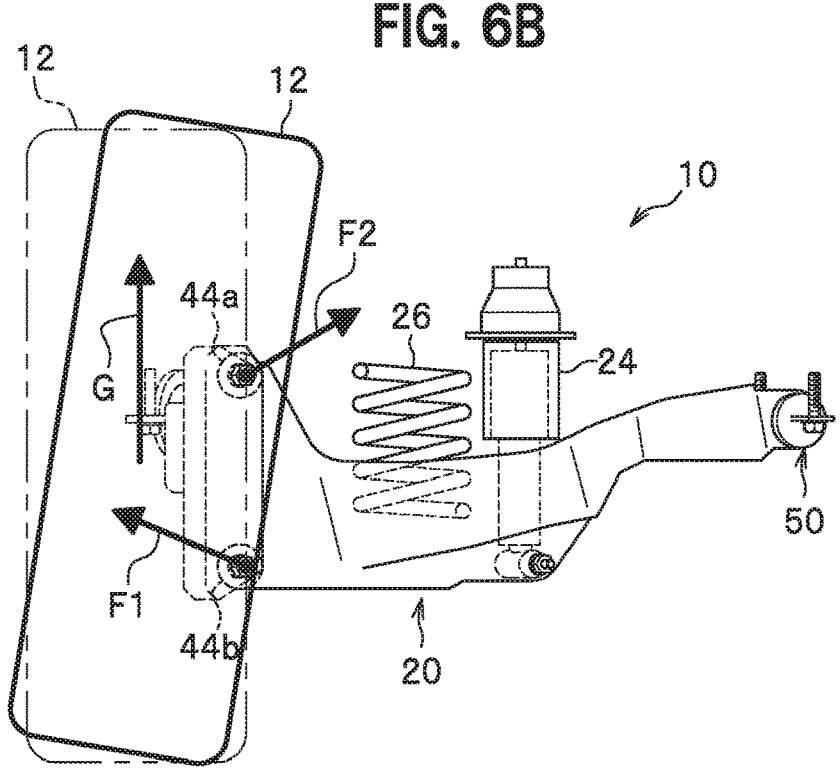
FIG. 6B is a schematic diagram showing a supported situation of the suspension device shown in FIG. 1 when a suspension stroke is applied to the suspension device.
Figure 7A:
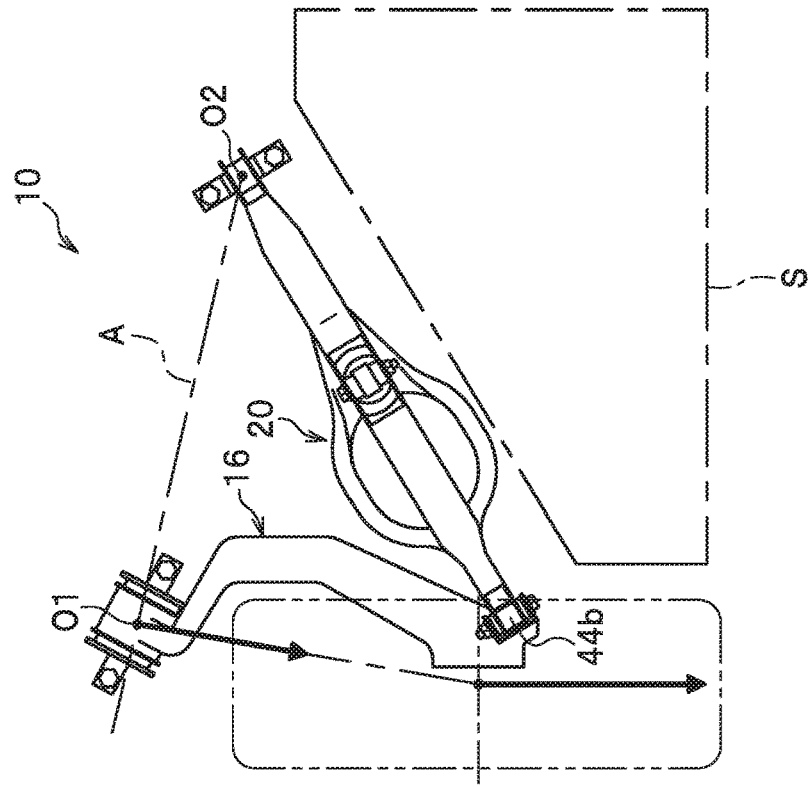
FIG. 7A is a top plan view showing a relationship between the suspension device and a layout space according to the present embodiment.
Figure 7B:
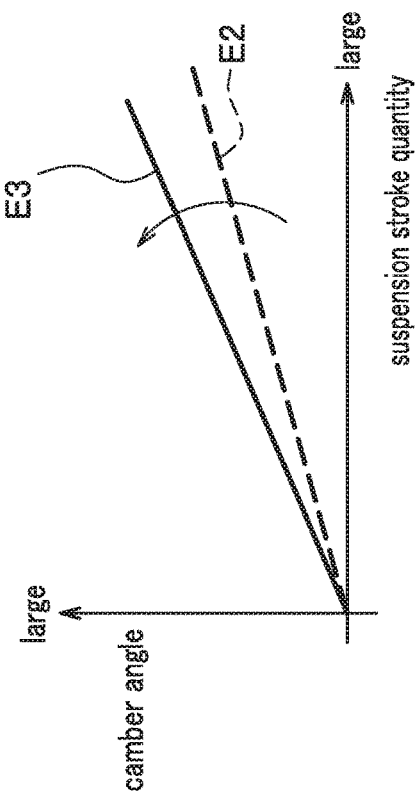
FIG. 7B is a characteristic diagram showing a relationship between a suspension stroke quantity of the suspension device and a camber angle according to the present embodiment.

The suspension device 10 according to the present embodiment is made as described above. Next, advantages thereof will be explained. FIG. 6A is a schematic diagram showing a supported situation of the suspension device shown in FIG. 1 when a lateral force is applied to the suspension device; FIG. 6B is a schematic diagram showing a supported situation of the suspension device shown in FIG. 1 when a suspension stroke is applied to the suspension device; FIG. 7A is a top plan view showing a relationship between the suspension device and a layout space according to the present embodiment; and FIG. 7B is a characteristic diagram showing a relationship between a suspension stroke quantity of the suspension device and a camber angle according to the present embodiment.

In the present embodiment, the stiffness of the lower bush 44b is higher than that of the upper bush 44a. As shown in FIG. 6A, for example, a lateral force Y is applied as an input load, the lower bush 44b having higher stiffness than that of the upper bush 44a can support a large component force F1 (a component force whose direction is the same as that of the lateral force Y) caused by the lateral force Y, and keep the suspension stiffness at high. At the same time, a component force F2 whose direction is opposite to that of the lateral force Y is applied to the upper bush 44a. Since the component force F2 is smaller than the component force F1

(F1>F2), the upper bush 44a having lower stiffness than that of the lower bush 44b can support the component force F2.

In addition, in the present embodiment, the stiffness of the upper bush 44a is lower than that of the lower bush 44b. As shown in FIG. 6B, for example, when a suspension stroke G is applied in the vertical direction as an input load, the component force F2 is applied to the upper bush 44a in a vehicle width inner direction. In this way, the upper bush 44a having lower stiffness than that of the lower bush 44b can be displaced toward a vehicle width direction inner side, a camber angle (a negative camber) of the wheel 12 is increased, and a large camber characteristics can be obtained. In addition, the component force F1 is applied to the lower bush 44b in a vehicle width outer direction by the suspension stroke G.

Figure 10A:
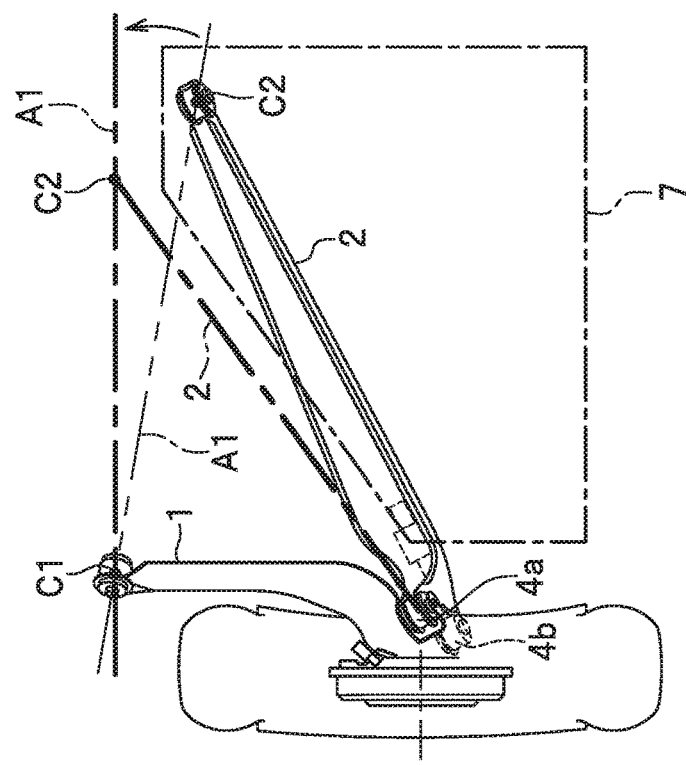
FIG. 10A is a top view showing a situation in which a semi-trailing axis of the suspension device of prior art is moved in the relation to the layout space.
Figure 10B:
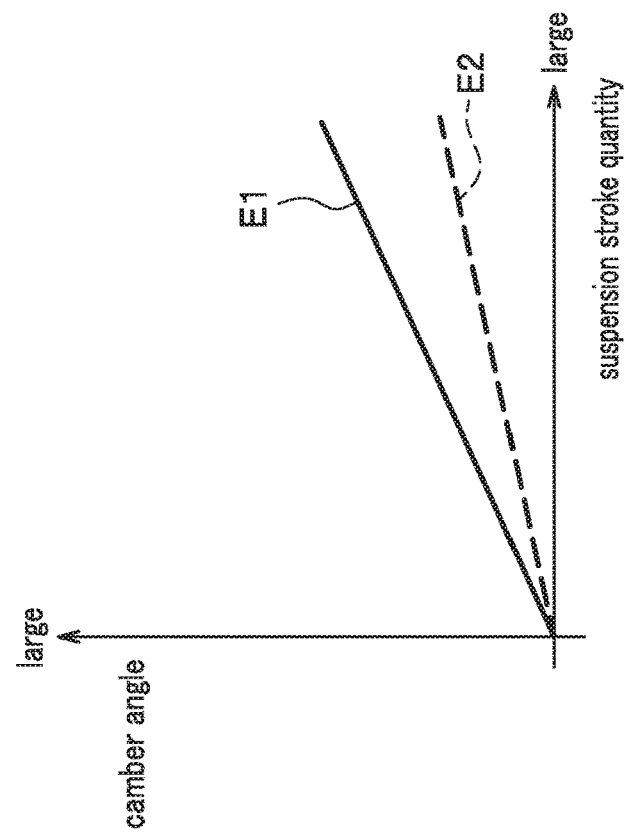
FIG. 10B is a characteristic diagram showing a relationship between a suspension stroke quantity and a camber angle of the suspension device shown in FIG. 10A.

As a result, in the present embodiment, if a desired layout space S is secured, the semi-trailing axis A is not moved (see FIG. 7A). In contrast to a prior art shown in FIG. 10B, the description in the camber characteristics can be avoided, and a necessary camber characteristics line E3 can be obtained (see FIG. 7B).

Figure 8A:
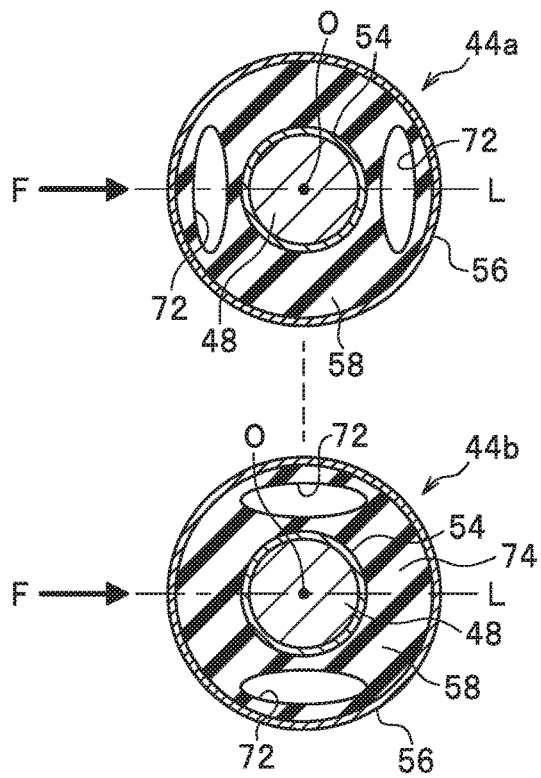
FIGS. 8A-8C are sectional views showing upper bush and the lower bush having different stiffnesses.
Figure 8B:
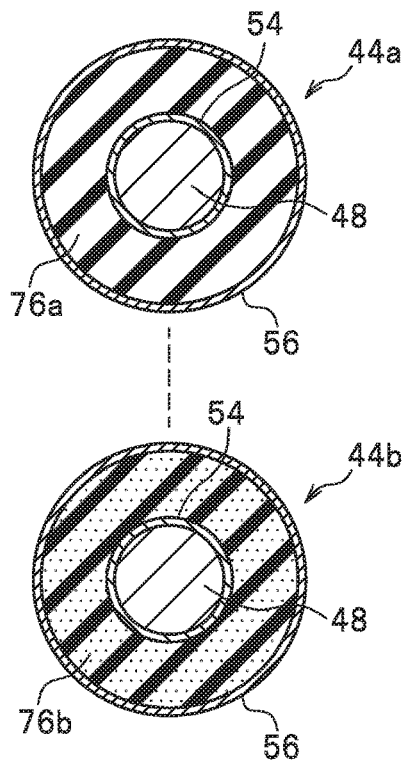
Figure 8C:
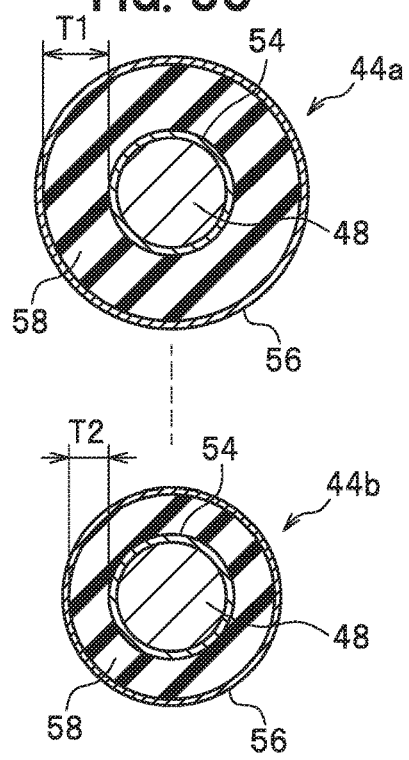
Figure 9A:
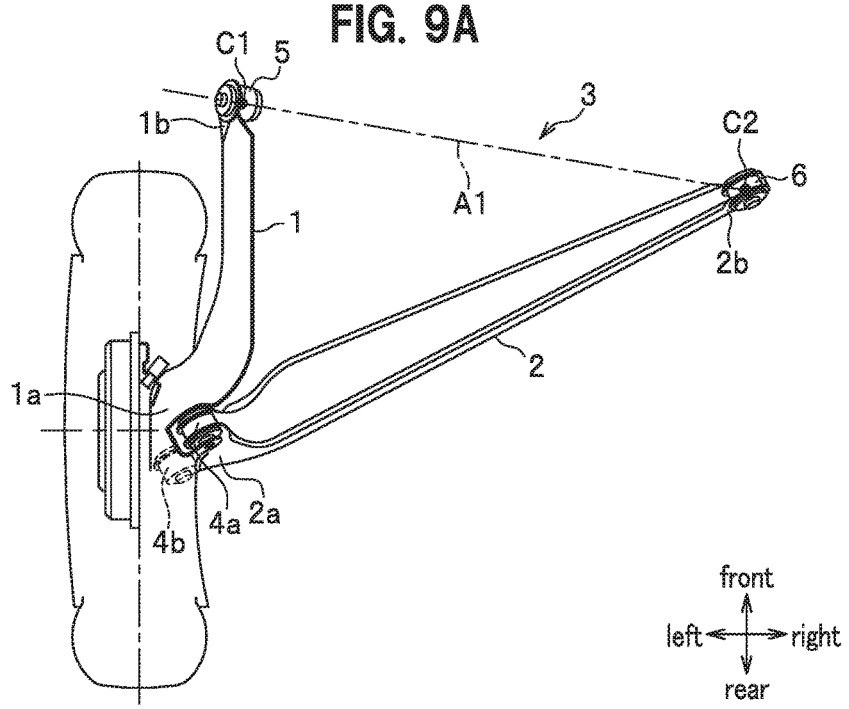
FIG. 9A is a top view of a suspension device of prior art.
Figure 9B:
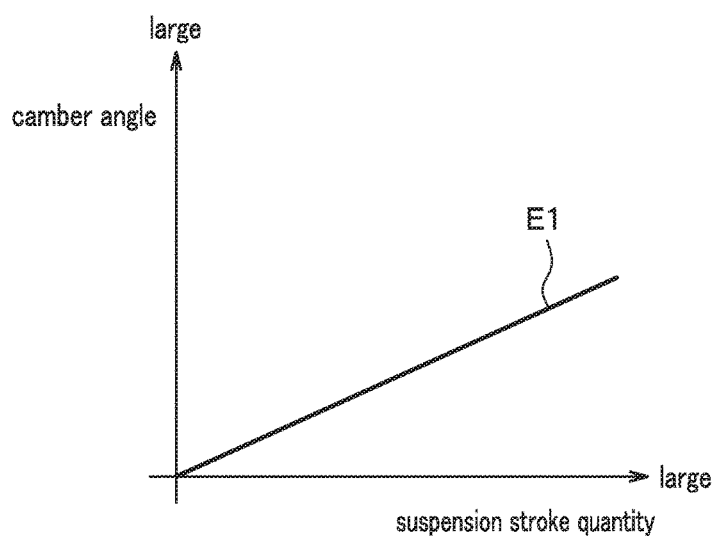
FIG. 9B is a characteristic diagram showing relationship between a suspension stroke quantity and a camber angle of the suspension device shown in FIG. 9A.

Next, how to make the upper bush 44a and the lower bush 44b having different stiffnesses will be explained. FIGS. 8A-8C are sectional views showing an upper bush and a lower bush having different stiffnesses. Reference signs in FIGS. 8A-8C correspond to those of the bushes according to the first and second examples shown in FIGS. 5A-5C.

As shown in FIG. 8A, the upper bush 44a having low stiffness can be made by forming a void section 72 on a virtual line L connecting an input load F and a center point O of the bolt 48 in the rubber elastic body 58. In contrast, the lower bush 44b having high stiffness can be made by forming a solid section 74 (not the void section 72) on the virtual line L connecting the input load F and the center point O of the bolt 48. In addition, the upper bush 44a and the lower bush 44b shown in FIG. 8A are made of the same bush. The stiffness of the upper bush 44a and the lower bush 44b varies depending on a direction (an angle) of an applied load.

As shown in FIG. 8B, the upper bush 44a and the lower bush 44b are made of rubber elastic bodies having the same thicknesses. The rubber elastic body of the upper bush 44a is made of a soft rubber 76a, and the rubber elastic body of the lower bush 44b is made of a soft rubber 76b. As a result, the upper bush 44a and the lower bush 44b having different stiffnesses can be made easily.

Further, as shown in FIG. 8C, the upper bush 44a and the lower bush 44b are made of the rubber elastic bodies 58 having different thicknesses (i.e., outer diameters). The elastic force of the upper bush 44a is different from that of the lower bush 44b (i.e., the elastic force of the lower bush 44b is higher than that of the upper bush 44a). As a result, the bushes having different stiffnesses can be made. That is, a thickness T1 of the rubber elastic body of the upper bush 44a is made to be thick, and a deformation quantity of the rubber elastic body 58 is made to be large. A thickness T2 of the rubber elastic body 58 of the lower bush 44b is made to be thin (T1>T2), and a deformation quantity of the rubber elastic body 58 is made to be small. As a result, the stiffness of the upper bush 44a is different from that of the lower bush 44b.

In addition, for example, a well know Magneto-rheological Elastomer (MR elastomer) can be used for the rubber elastic body 58. The upper bush 44a and the lower bush 44b having different stiffnesses can be made by applying magnetic field to the MR elastomer so as to change an apparent elasticity.

REFERENCE SIGN LIST 10 suspension device
12 wheel
14 vehicle body
16 trailing arm
20 lower arm
22 hinge mechanism
24 damper
26 spring
32 trailing bush
32a L-shaped bent section
44a upper bush
44b lower bush
50 lower arm bush
58 rubber elastic body

The invention claimed is:

1. A semi-trailing suspension device comprising:
a trailing arm that is coupled to a vehicle body in a turnable manner;
a trailing bush that is provided between the vehicle body and the trailing arm and pivotally supports the trailing arm in a turnable manner;
a lower arm that is coupled to the vehicle body in a turnable manner;
a lower arm bush that is provided between the vehicle body and the lower arm and pivotally supports the lower arm in a turnable manner; and
a hinge mechanism that couples the trailing arm and the lower arm to each other in a relatively displaceable manner, wherein
the hinge mechanism is provided with an upper bush disposed on an upper side and a lower bush disposed on a lower side,
the upper bush and the lower bush respectively include an inner cylindrical member, and outer cylindrical member that is disposed on the outer diameter side of the inner cylindrical member, a rubber elastic body provided between the inner cylindrical member and the outer cylindrical member, and a bolt that passes through the inner cylindrical member,
the upper bush has a void section on a virtual line connecting an input load and a center point of the bolt in the rubber elastic body,
the lower bush has a void section on a line other than a virtual line connecting an input load and a center point of the bolt,
the upper bush and the lower bush are made of the same bush, and
a stiffness along the virtual line connecting the input load and the center point of the bolt of the upper bush is lower than that along the virtual line connecting the input load and the center point of the bolt of the lower bush.

2. The semi-trailing suspension device according to claim 1, wherein
the upper bush and the lower bush have rubber elastic bodies respectively, and
the rubber elastic body of the upper bush is made of a soft rubber, and the rubber elastic body of the lower bush is made of a hard rubber.

* * * * *